(12) United States Patent  
Hearne, Jr.

(10) Patent No.: US 6,202,434 B1
(45) Date of Patent: Mar. 20, 2001

(54) PORTABLE COMBINATION HYDRO COOLING AND FORCED REFRIGERATED AIR COOLING UNIT

(76) Inventor: William P. Hearne, Jr., P.O. Box 1975, Salisbury, MD (US) 21802

( * ) Notice: Subject to any disclaimer, the term of this patent is extended or adjusted under 35 U.S.C. 154(b) by 0 days.

(21) Appl. No.: 09/412,698

(22) Filed: Oct. 5, 1999

(51) Int. Cl.[7] .................................. F28D 5/00
(52) U.S. Cl. .......................... 62/304; 62/332; 62/314; 62/326
(58) Field of Search ............................. 62/332, 304, 314, 62/326

(56) References Cited

U.S. PATENT DOCUMENTS

| 3,604,217 | 9/1971 | Spear . | |
|---|---|---|---|
| 3,844,203 | * 10/1974 | Takahashi | 98/33 |
| 3,961,925 | 6/1976 | Rhoad . | |
| 4,060,400 | 11/1977 | Williams . | |
| 4,406,131 | 9/1983 | Weasel, Jr. . | |
| 4,709,852 | * 12/1987 | Stoll | 229/119 |
| 4,748,824 | * 6/1988 | Wakabayashi et al. | 62/239 |
| 4,936,100 | 6/1990 | Leppa . | |
| 4,991,402 | * 2/1991 | Saia, III | 62/52.1 |
| 5,003,789 | * 4/1991 | Gaona et al. | 62/304 |
| 5,005,367 | * 4/1991 | Hwang | 62/133 |
| 5,291,746 | * 3/1994 | Abbott | 62/89 |
| 5,325,681 | * 7/1994 | Ellis et al. | 62/314 |
| 5,377,502 | * 1/1995 | Collins et al. | 62/304 |
| 5,729,983 | 3/1998 | Garrett et al. . | |

* cited by examiner

Primary Examiner—William Doerrler
Assistant Examiner—Mark Shulman
(74) Attorney, Agent, or Firm—Thomas C. Saitta

(57) ABSTRACT

A portable cooling trailer for cooling produce at the harvest site, where the produce may be cooled by either forced air refrigeration, where cooled air is drawn through the produce and recycled through a heat exchanger, or hydro cooling, where chilled water is sprayed onto the produce, recaptured and recycled through the heat exchanger.

7 Claims, 2 Drawing Sheets

PORTABLE COMBINATION HYDRO COOLING AND FORCED REFRIGERATED AIR COOLING UNIT

BACKGROUND OF THE INVENTION

This invention relates generally to the field of transportable cooling units comprising a relatively large compartment for receiving produce such as fruits and vegetables and means to rapidly reduce the temperature of the produce within the compartment for subsequent transfer into delivery trailers. More particularly, the invention relates to units which incorporate the techniques of hydro cooling, where chilled water is directed over and through the produce, and forced refrigerated air cooling, where air is cooled by a refrigerant expansion system and circulated through the produce.

When fruits and vegetables are harvested, the ripening or spoilage process begins immediately. It is well known that cooling or refrigeration of the produce slows ripening and reduces this deterioration, thus increasing shelf life and freshness. The more rapidly the produce is cooled following harvest, the better the results. Since harvesting usually occurs during warm weather months, the produce contains a large amount of field heat. Additionally, the produce itself creates heat through respiration. The deterioration due to heat is directly related to loss of moisture from the produce, which shortens shelf life and reduces the quality of the produce. The differential in vapor pressure between the produce cells and the surrounding air determines the rate of moisture loss. Low air temperature and high moisture content lowers moisture loss from the produce. For certain produce rapid cooling by hydro cooling is preferred, for other types of produce cooling by refrigerated air is preferred, and for others a combination of the two may be best. Alternatively, environmental or other site specific conditions may dictate the preferred cooling method.

Since it is most beneficial to cool the harvest as soon as it is picked, transportable cooling units have been developed to provide means to accomplish the cooling at the harvest site itself, the provision of permanent cooling structures at the vast number of harvest sites being cost prohibitive and not optimally effective since construction of a permanent cooling structure at a generally centralized location requires the produce to be first transported to the structure, with heat deterioration occurring during the transport and waiting period. One approach to cooling the produce immediately upon harvest at the harvest site has been to improve the cooling efficiency of the refrigerated produce delivery trailers themselves, i.e., the trailers used to transport the harvest from the field to the distribution or processing centers, such that less time is required to reach the desired temperature once the delivery trailers are loaded. The problem with this approach is that a compromise must be maintained between the desire to lessen the weight and space requirements of the cooling equipment, so that container space and fuel efficiency is maximized, and the desire to maximize the efficiency of the cooling equipment, since reducing the time required to cool the produce is directly related to the weight, size and type of the equipment utilized. Thus while advances have been made in improving the cooling efficiency of the delivery trailers, the more optimum approach has been directed toward providing specialized portable cooling units with large and efficient cooling capabilities which can be driven to the individual harvest sites, where the portable cooling units are used to rapidly cool the produce prior to loading into the delivery trailers or to cool the delivery trailers after the produce has been loaded, the increased cooling capability of the large portable cooling units providing a relatively rapid reduction in temperature not attainable by the limited cooling units incorporated into the delivery trailers.

There are several common methods utilized to cool the produce after harvest. The most common method is by the use of a recirculating refrigerant unit which circulates a refrigerant gas such as Freon through an expansion/compression cycle with warm air, either external air from the ambient or preferably air within the trailer, being drawn across cooling coils to reduce the temperature of the air. The cooled air is then passed through the produce by forced air means such as a fan. Another method is known as cryogenic cooling, where a reserve of super-cooled gas such as liquid nitrogen or carbon dioxide is allowed to expand by spraying it into the trailer, causing heat to be drawn from the produce. Still another method is known as hydro cooling, where chilled water is sprayed onto the produce from overhead nozzles, the water being drained or recycled, as shown in U.S. Pat. No. 3,961,925 to Rhoad.

It is known to provide several of the known cooling methods into a single portable cooling unit. For example, U.S. Pat. No. 4,060,400 to Williams and U.S. Pat. No. 4,936,100 to Leppa show a trailer which encompasses both a cryogenic cooling unit and a mechanical refrigeration cooling unit. U.S. Pat. No. 4,406,131 to Weasel, Jr., teaches a trailer utilizing both hydro cooling and cryogenic cooling. U.S. Pat. No. 3,604,217 to Spear shows a combination hydro cooling and vacuum cooling unit.

A drawback to cryogenic systems where the trailer is filled with a nitrogen, carbon dioxide or other non-breathable gas is that the units must be purged and the atmosphere replaced with ambient air before personnel can enter the trailer. In addition, the cryogenic gases must be transported to the remote harvest sites, since on-site sources will not be available.

It is therefore an object of this invention to provide a portable apparatus and method for the rapid cooling of produce at the harvest location, where the produce is placed into the portable cooling apparatus, cooled sufficiently and then transferred into delivery trailers for removal from the harvest site, where the cooling methodology involves the use of forced air refrigeration, hydro cooling or both, and where the forced air refrigeration equipment involves passing air through a chilled water cascade in a heat exchanger with the cooled air then forced through the produce and circulated back through the water cascade, and further where the cooling unit can be utilized as a hydro cooler by importing additional water from an on-site water source, chilling the water in the water cascade, pumping the cooled water onto the produce through nozzles in the ceiling of the trailer and recapturing the water in a capture reservoir under the trailer floor to cycle it back through the heat exchanger for recooling.

SUMMARY OF THE INVENTION

The invention is in general a portable combination hydro cooling and forced refrigerated air cooling apparatus for cooling produce or the like at the harvest site prior to transport, comprising in general means to cycle air or water through cooling means and then into a relatively large cooling compartment, through large amounts of produce placed within the compartment, and then repeatedly back through the cooling means to significantly and rapidly lower the temperature of the produce. The portable cooling unit is preferably constructed as a wheeled trailer which can be pulled to the harvest site by a motorized tractor in known manner, where the cooling compartment comprises a large enclosed area accessible by rear or side mounted doors and where the cooling means is provided in a separate part of the trailer.

The cooling means comprises a mechanical refrigeration system of the expansion/compression type where a compressed refrigerant gas is passed into expansion coils. Water is drawn from a retention sump and cascaded over the coils within a heat exchanger, and the expanding refrigerant gas draws heat from the water. For the forced air cooling method, air is drawn upward through the chilled water cascade to remove heat from the air, and the cooled air is then forced into the cooling compartment by fans mounted near the ceiling of the cooling compartment. The cooled air is drawn down through the produce to remove heat, and the warmed air is then pulled through a return air channel positioned adjacent the cooling means and cycled back through the water cascade. The process is then repeated until the desired reduction in temperature of the produce is reached. The refrigerant gas and the cascade water are also repetitively cycled in known manner. For the hydro cooling method, additional water is loaded into a large capture reservoir beneath the interior floor of the cooling compartment. This water is pumped into the heat exchanger and cascaded over the cooling coils and chilled, with the chilled water then pumped through spray headers mounted in the ceiling of the cooling compartment, where it flows through the produce to remove heat and then drains into the capture reservoir for cycling back over the cooling coils in the water sump.

DETAILED DESCRIPTION OF THE INVENTION

Figure 2:
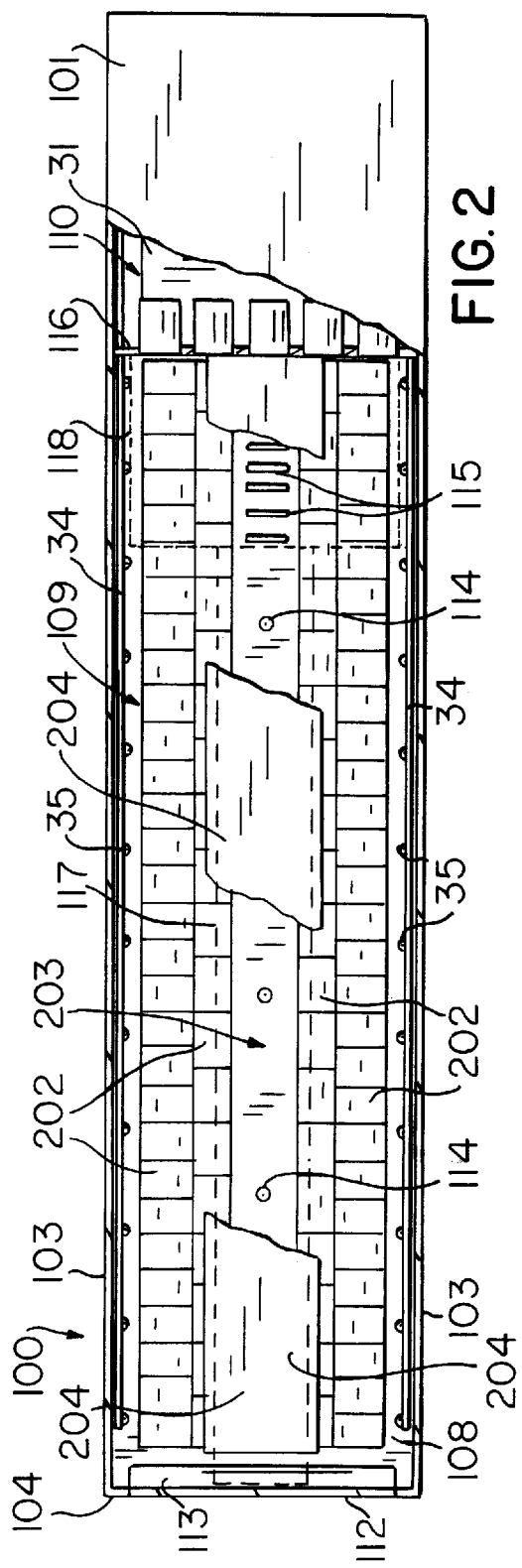
FIG. 2 is a top view of the cooling unit with the top wall substantially removed and portions of the air flow control member removed to expose the interior.
Figure 1:
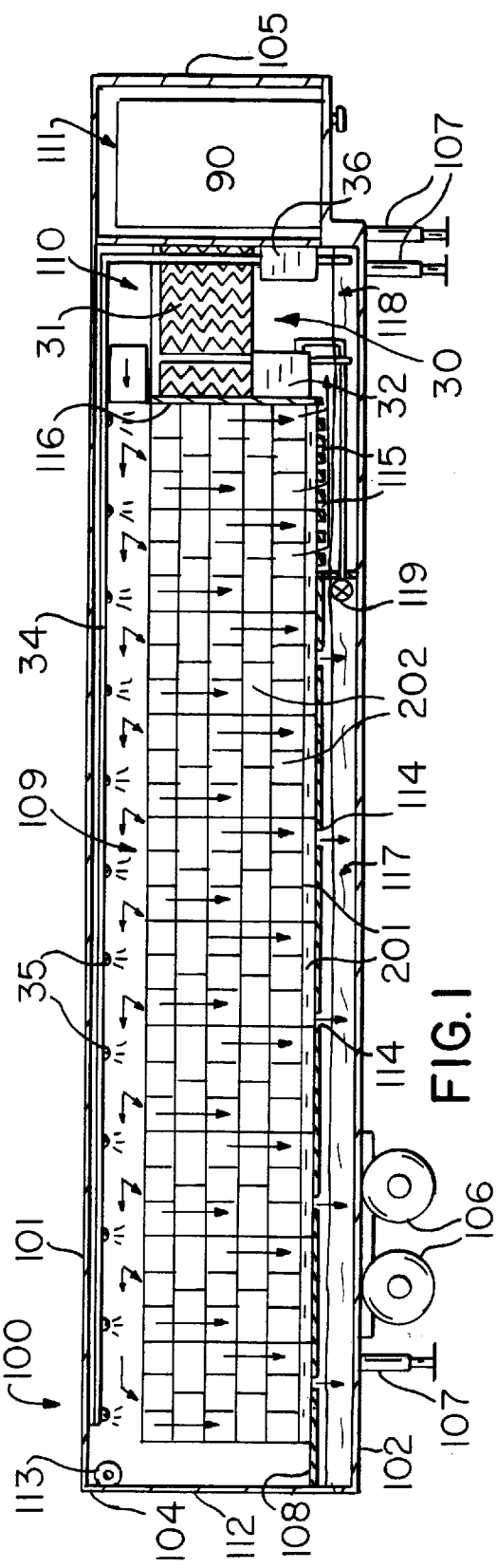
FIG. 1 is a side of the cooling unit with the near side wall removed to expose the interior.
Figure 3:
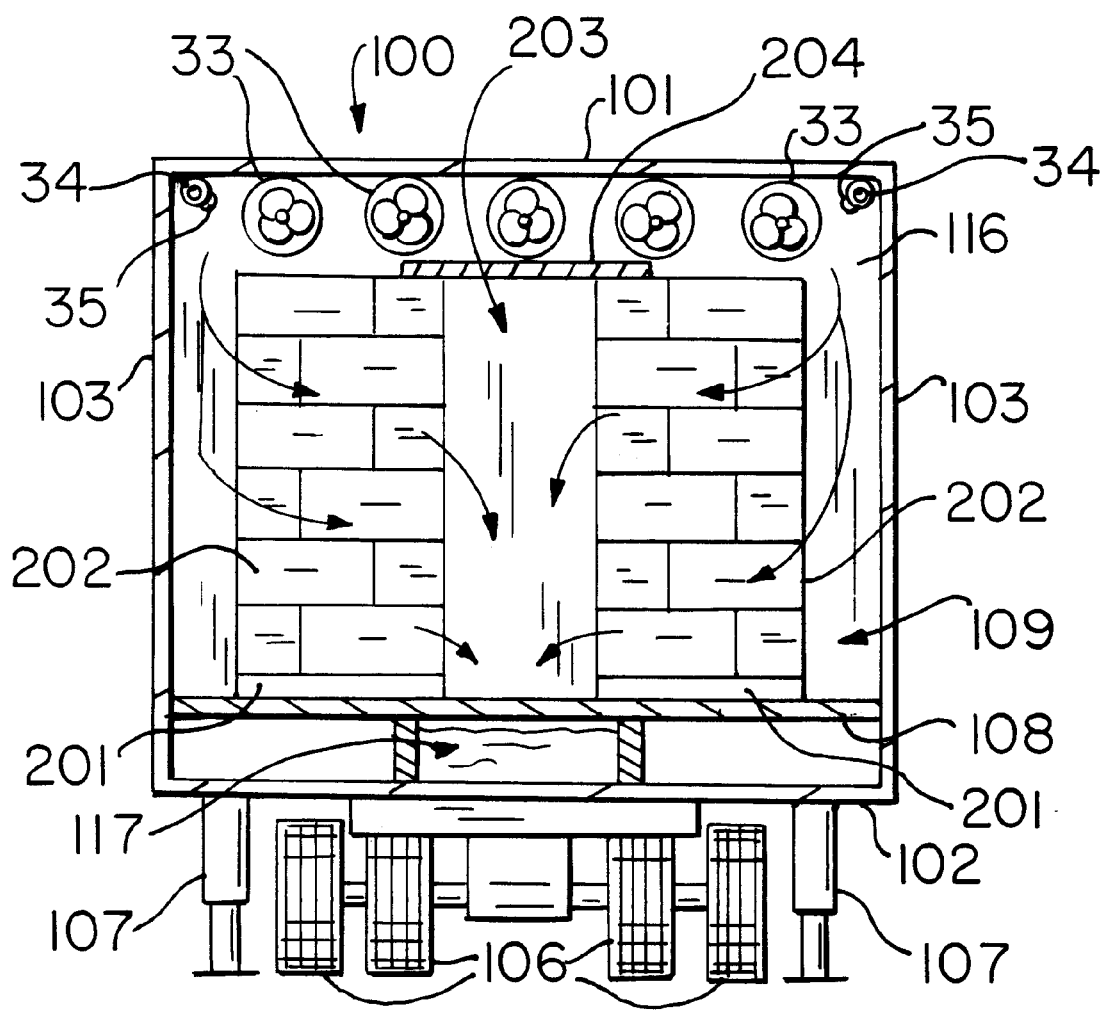
FIG. 3 is a rear end view of the cooling unit with the end wall and door removed to expose the interior.

With reference to the drawings, the invention will now be described in detail with regard for the best mode and the preferred embodiment. In general, the invention comprises a portable cooling unit for reducing the temperature of articles placed into the unit, and in particular is designed to reduce the temperature of freshly harvested produce, such as fruits or vegetables at the harvest site, prior to the produce being loaded onto delivery means, such as trucks or trailers, for transport to distribution or processing sites. Preferably, the cooling unit is constructed as a wheeled, insulated trailer which can be moved by a truck tractor to different locations. In this embodiment, the cooling unit 100 comprises a top wall 101, bottom wall 102, side walls 103, end or rear wall 104, a front wall 105 and an internal floor 108 which together define a sealable, enclosed area which is subdivided into a cooling compartment 109, air treatment compartment 110 and refrigeration equipment compartment 111. The cooling unit 100 is mounted on wheels 106 and extendable stabilizer legs 107 are provided for use when the unit 100 is operational. One or more doors 112, shown as a rear-mounted, roll-up type with door reel 113, is provided to allow access into the cooling compartment 109. The overall structure of the cooling unit 100 is similar to typical semi-trailer constructions, in that the unit 100 is generally rectangular in configuration and sized to be transportable along roadways. The floor 108 of the cooling compartment 109 is constructed to be sufficiently strong to support multiple pallets 201 loaded with produce crates 202, the crates 202 being apertured or slotted such that air is free to pass into and through the crates 202 and the produce contained therein. The pallets 201 are arranged within the cooling compartment 109 in two longitudinal rows to define a central corridor 203 extending to the front of the cooling compartment 109, and the pallets 201 are loaded such that the crates 202 are generally even along the top and such that crates 202 abut other crates 202 on adjacent pallets 201 to form a generally continuous lateral wall on each side of the central corridor 203. A flexible, solid air flow control member 204, such as a tarp, is positioned atop the crates 202 extending from the front of the cooling compartment 109 to the rear of the pallets 201 and down to the floor 108. In this manner the central corridor 203 is an enclosed area bounded by the interior wall 116 of the cooling compartment 109, the floor 108, the air flow control member 204 and the lateral walls formed by the crates 202. Air drawn into the central corridor 203 must therefore pass through the crates 202. One or more liquid drains 114 are located in floor 108, and return air vents 116 are positioned in the forward part of the floor 108, as shown, or in the lower section of the interior wall 116. A relatively large capture reservoir 117 is located under the floor 108, the capture reservoir 117 receiving water flowing through the drains 114. The capture reservoir 117 is ported so that water from an outside source may be introduced into and removed from the reservoir 117. A water pan or sump 118 is provided under the floor 108 forward of the reservoir 117, part of the water sump 118 being positioned beneath the air return vents 115 and part being under the air treatment compartment 110 to receive water from the water cascade. The water sump 118 also defines a pathway or plenum for the return air flow between the air vents 115 and the forced air cooling means 30. An equalizing valve 119 is provided between the capture reservoir 117 and the water sump 118 so that equal water levels are maintained during the hydro cooling process.

The forward refrigeration equipment compartment 111, which may be fully or partially enclosed, contains the mechanical refrigeration means 90, which comprises a standard assembly of equipment necessary for accomplishing expansion and compression of a refrigerant gas, such as Freon, to perform mechanical refrigeration in the commonly known manner. Such equipment is well known in the art, and comprises power means, a compressor, an evaporator condenser, a suction accumulator, expansion coils, control means and various other components, and those skilled in the art can readily construct the necessary assembly, which preferably provides at least approximately 55 tons of refrigeration and most preferably provides approximately 110 tons of refrigeration. The expansion coils containing the refrigerant are extended into the air treatment compartment 110 and encompassed within a heat exchanger 31, which comprises part of the air and water cooling means 30.

The heat exchanger 31 is of the water cascade type, and is comprised of a high surface area to volume media. Water drawn from either the water sump 118 (for forced air cooling) or from the capture reservoir 117 (for hydro cooling) by pump means 32 is passed over the coils and chilled. The chilled water then cascades through the heat exchanger 31 and into the water sump 118, from which it is cycled again over the coils. Such devices are well known and produce water chilled to approximately 33 degrees F. and even less if freeze point reducing additives such as salt or glycol are provided. The cooling means 30 further comprises a plural number of high volume static pressure fans 33 positioned near the top of the internal wall 116 and communicating between the air treatment compartment 110 and the cooling compartment 109. The fans 33 are used for forced air cooling and are located above the crates 202 and above the heat exchanger 31 and pull air through the air vents 115 in the floor 108 of the cooling compartment 109, through the air treatment compartment 110 and force it into the upper part of the cooling compartment 109. Because the air flow control member 204 blocks the top and rear of the central corridor 203 between the crates 202, the air is forced through the exposed tops and outsides of the crates 202, and then drawn from the crates 202 through the lateral walls and into the central corridor 203. This air, having been cooled in the heat exchanger 31, draws heat from the cooling compartment 109 and from the produce itself, thus lowering the temperature. Because of the closed cycle, the now warmed air within the central corridor 203 is drawn through the air return vents 115, through the chilled water cascade in the heat exchanger 31 where it is again cooled, and forced back into the cooling compartment 109. This cycle is continued until the desired temperature is achieved within the cooling compartment 109.

For hydro cooling, additional water must be present in the capture reservoir 117 since a much greater volume of water is necessary than that required for the water cascade in the forced air cooling method. This water will typically be delivered into the capture reservoir 117 at the harvest site to reduce weight during transportation of the cooling unit 100. An equalizer valve 119 is opened to equalize the water levels in the reservoir 117 and the water sump 118. Water is drawn from the capture reservoir 117 by pump 32 through suitable conduit arrangements, or a second pump not shown is provided. The second pump may be necessary in that a much greater flow rate is required for hydro cooling (approximately 1600 gpm) than for air cooling (approximately 450 gpm). The water is passed over the refrigerant coils in the heat exchanger 31, but the fans 31 are not activated and thus no air is drawn through the heat exchanger 31. Thus water entering the water sump 118 is maximumly chilled. Distribution conduits 34 are disposed along the interior of the top wall 101 of the cooling compartment, preferably extending longitudinally adjacent or near each side wall 103. A plurality of spray nozzles 35 are positioned along the conduits 34. A pump means 36 draws chilled water from the water sump 118 and pumps it through the nozzles 35, where the chilled water falls onto the top of the crates 202 and filters down through the crates 202 and over the produce, and then to the floor 108. As with the chilled air, the chilled water absorbs heat from the cooling compartment 109 and the produce, thereby reducing the temperature. The warmed water then passes through the drains 114 into the capture reservoir 117 or through the vents 115 into the water sump 118. The cycle is then continuously repeated until the desired temperature is reached within the cooling compartment 109.

It is understood that equivalents and substitutions for certain elements set forth above may be obvious to those skilled in the art, and the true scope and definition of the invention therefore is to be as set forth in the following claims.

I claim:

1. A method of cooling produce at the harvest site comprising the steps of:

harvesting the produce and placing the produce inside a portable cooling unit, said cooling unit having the capability of cooling the produce by either forced air refrigeration means or hydro cooling means;

where said step of cooling the produce by hydro cooling means comprises importing water into the portable cooling unit, chilling the water in a chilled water cascade, pumping the water onto the produce through nozzles positioned above the produce, capturing the water in a reservoir, and cycling the water back through the chilled water cascade, where the cycle is repeated until the produce has been cooled to a desired temperature;

choosing one of the two said means for cooling the produce and cooling the produce using the chosen means; and removing the cooled produce from the portable cooling unit.

2. The method of claim 1, where said step of cooling the produce by forced air refrigeration means comprises passing air through a chilled water cascade in a heat exchanger, passing the air over and through the produce to remove residual heat in the produce, and circulating the air back through the chilled water cascade, where the cycle is repeated until the produce has been cooled to a desired temperature.

3. The method of claim 1, where said step of cooling the produce by hydro cooling means comprises importing water into the portable cooling unit, chilling the water in a chilled water cascade, pumping the water onto the produce through nozzles positioned above the produce, capturing the water in a reservoir, and cycling the water back through the chilled water cascade, where the cycle is repeated until the produce has been cooled to a desired temperature.

4. A portable cooling unit for lowering the temperature of produce or other articles, said cooling unit comprising a cooling compartment and cooling means to lower the temperature of the cooling compartment and produce or other articles placed within said cooling compartment, said cooling means comprising a mechanical expansion/compression refrigeration system having compressed refrigerant gas passed into expansion coils, water drawn from a sump and cascaded over said coils within a heat exchanger, a fan to force air through said heat exchanger and into said cooling compartment and to cycle said air through said cooling compartment and said heat exchanger, a pump and distribution conduit to deliver said water into said cooling compartment, a capture reservoir within said cooling compartment to receive said water, and a pump to cycle said water back over said coils.

5. The portable cooling unit of claim 4, where said cooling unit is a wheeled, insulated trailer.

6. A portable cooling unit for lowering the temperature of produce or other articles, said cooling unit comprising a cooling compartment and cooling means to lower the temperature of the cooling compartment and produce or other articles placed within said cooling compartment, said cooling means comprising mechanical refrigeration means comprising a water cascade heat exchanger, forced air refrigeration means to deliver cooled air from said heat exchanger into said cooling compartment and back into said heat exchanger, and hydro cooling means to deliver chilled water from said heat exchanger into said cooling compartment and back into said heat exchanger.

7. The portable cooling unit of claim 4, where said cooling unit is a wheeled, insulated trailer.

* * * * *